United States Patent Office 3,686,108
Patented Aug. 22, 1972

3,686,108
LIGHT FAST QUATERNIZED OR AMINE SALT POLYURETHANES FROM 2-ALKYL - 2 - DIALKYLAMINOMETHYL-1,3-PROPANE DIOLS
Helmut Reiff, Cologne-Flittard, and Dieter Dieterich, Leverkusen, Germany, assignors to Farbenfabriken Bayer Aktiengesellschaft, Leverkusen, Germany
No Drawing. Filed Apr. 21, 1971, Ser. No. 136,252
Claims priority, application Germany, Apr. 22, 1970, P 20 19 324.2
Int. Cl. C08g 22/02, 22/08, 22/10
U.S. Cl. 260—29.2 TN
4 Claims

ABSTRACT OF THE DISCLOSURE

Light fast polyurethane ionomers are prepared from the usual starting materials for the preparation of polyurethanes and 2 - alkyl - 2-dialkylaminomethyl-1,3-propane diols and quaternising or neutralising agents. The novel polyurethane ionomers may be used from their solutions or as aqueous dispersions for coating or impregnating of various substrates.

---

Polyurethanes which contain quaternary ammonium nitrogen atoms and which are obtained by the diisocyanate polyaddition process are already known. They are produced inter alia from higher molecular weight polyhydroxyl compounds, polyisocyanates, glycols which contain tertiary nitrogen atoms used as quaternisable chain-lengthening agents, optionally with the addition of chain-lengthening agents which do not contain tertiary nitrogen atoms, and quaternising agents.

Thus, for example according to U.S. Pats. 3,338,087, 3,480,592, 3,479,310 and U.S. patent application Ser. No. 43,651 filed on Apr. 29, 1970, polyurethanes which contain quaternary ammonium nitrogen atoms can be synthesised in solution, and stable, cationic, aqueous dispersions can then be obtained from them by the addition of water and removal of the solvent by distillation.

According to Belgian patent specification 703,521 and U.S. patent application Ser. No. 701,106 filed on Jan. 29, 1968, sedimenting, redispersible polyurethane suspensions are obtained on the same principle. It is also known to produce polyurethanes which contain quaternary ammonium nitrogen atoms in the melt according to U.S. patent application Ser. No. 809,987 filed on Mar. 24, 1969 and to obtain stable, cationic polyurethane dispersions from them after the addition of water. One variation of this process consists in that the polyurethanes contain acylated amino end groups and can, therefore, be chain lengthened with formaldehyde. The dispersion process may in this case be carried out during or after methylolation.

It is also known that polyurethanes, especially those based on aromatic isocyanates, tend to become yellow. This tendency is generally increase by the incorporation of tertiary or quaternary nitrogen atoms, so that in this case even aliphatic isocyanates which are known to be light fast no longer yield lightfast products. Moreover, it has hitherto been customary to use as chain lengthening agents almost exclusively basic glycols of the type N-alkyldiethanolamine in which the nitrogen atom is in the β-position to the oxygen atom and lies in the main chain of the polyurethane. Degradation of the polyurethane chains frequently occurs in the course of yellowing.

It has now surprisingly been found that products which have a degree of light fastness hitherto unknown are obtained when 2 - alkyl-2-dialkylaminomethyl-1,3-propane diols are used as the glycols which contain tertiary nitrogen atoms for the production of polyurethanes which contain quaternary ammonium nitrogen atoms. The necessary condition for this light fastness is obviously that the nitrogen atom should be in the γ-position to the oxygen atom and moreover should not lie in the main polyurethane chain.

The present invention relates to polyurethane polymers containing quaternary ammonium nitrogen in at least one structural unit of the general formula $$X-O-CH_2 \diagdown C \diagup CH_2-O-\overset{O}{\underset{\|}{C}}-NH- $$
$$R \diagup \diagdown CH_2-\overset{\oplus}{\underset{R_3}{N}}\overset{R_1}{\underset{R_2}{\diagdown}} \quad A^{\ominus}$$

wherein

R is an alkyl radical having 1 to 5 carbon atoms, and either
$R_1$ is an alkyl radical having 1 to 4 carbon atoms, and
$R_2$ is an alkyl radical having 1 to 18 carbon atoms, or
$R_1$ and $R_2$ together with the nitrogen atom form a heterocyclic ring containing 4 to 6 carbon atoms,
X is hydrogen or —CO—NH—,
$R_3$ is hydrogen, an alkyl radical or an aralkyl radical and
$A^{\ominus}$ is a singly negatively charged ion corresponding to an inorganic or organic acid.

The present invention also relates to the improvement of the process for the preparation of which light fast polyurethane ionomers which contain quaternary ammonium nitrogen by the isocyanate polyaddition process from organic polyisocyanates, compounds containing active hydrogen atoms that are reactive with isocyanate groups said compounds being free from tertiary nitrogen, glycols containing tertiary amino nitrogen and substances having a quaternising or neutralising action which comprises utilizing as the glycol containing tertiary amino nitrogen, a compound of the general formula $$R_1 \diagdown N-CH_2 \diagup \overset{R}{\underset{CH_2OH}{\diagdown C \diagdown}} CH_2OH$$
$$R_2 \diagup$$

wherein

R is an alkyl radical having 1 to 5 carbon atoms,
$R_1$ is an alkyl radical having 1 to 4 carbon atoms, and
$R_2$ is an alkyl radical having 1 to 18 carbon atoms, or
wherein $R_1$ and $R_2$ together with the nitron atom forms a heterocyclic ring containing 4 to 5 carbon atoms.

The present invention also relates to aqueous dispersions of these polyurethanes which contain quaternary ammonium nitrogen atoms.

The following are examples of glycols containing tertiary amino nitrogen atoms which are suitable for the process according to the invention:

2-methyl-2-dimethylaminomethyl-1,3-propanediol,
2-methyl-2-diethylaminomethyl-1,3-propanediol,
2-methyl-2-dipropylaminomethyl-1,3-propanediol,
2-methyl-2-pyrrolidinomethyl-1,3-propanediol,
2-methyl-2-piperidinomethyl-1,3-propanediol,
2-ethyl-2-dimethylaminomethyl-1,3-propanediol,
2-ethyl-2-diethylaminomethyl-1,3-propanediol,
2-ethyl-2-dipropylaminomethyl-1,3-propanediol,
2-ethyl-2-pyrrolidinomethyl-1,3-propanediol,
2-ethyl-2-piperidinomethyl-1,3-propanediol,
2-n-amyl-2-dimethylaminomethyl-1,3-propanediol,
2-n-amyl-2-diethylaminomethyl-1,3-propanediol,
2-methyl-2-(N-methyl-N-octylamino)-methyl-1,3-propanediol,
2-n-butyl-2-(N-ethyl-N-octadecylamino)-methyl-1,3-propanediol, etc.

The glycols which are preferably used for the process according to the invention are 2-methyl-2-dimethylaminomethyl - 1,3 - propanediol, 2 - methyl - 2 - diethylaminomethyl - 1,3 - propanediol, 2-ethyl-2-dimethylaminomethyl-1,3-propanediol and 2-ethyl-2-diethylaminomethyl-1,3-propanediol.

These 2 - alkyl - 2 - dialkylaminomethyl-1,3-propanediols are prepared according to Belgian patent specification 727,566 by decomposition of the corresponding oxetanes with secondary amines which have the appropriate structure.

Any polyisocyanates known in polyurethane chemistry may be used for the process according to the invention, e.g. 1,5-naphthylenediisocyanate, 4,4'-diphenylmethane diisocyanate, 4,4' - diphenyldimethylmethane diisocyanate, di- and tetralkyldiphenylmethane diisocyanate, 4,4' -dibenzyldiisocyanate, 1,3-phenylene diisocyanate, 1,4-phenylene diisocyanate, the isomers of toluylene diisocyanate or mixtures thereof, 1-methyl-2,4-diisocyanatocyclohexane, 1,6 - diisocyanato - 2,2,4 - trimethylhexane, cyclohexane - 1,4 - diisocyanate, dicyclohexylmethane diisocyanate, 1 - isocyanato - methyl - 3 - isocyanto-1,5,5-trimethylcyclohexane, butane-1,4-diisocyanate, hexane-1,6-diisocyanate, ethylene diisocyanate, p-xylene diisocyanate, m-xylylene diisocyanate and the hydrogenation products of all the above mentioned aromatic diisocyanates and optionally also mixtures of the above mentioned polyisocyanates and any polyfunctional compounds both of low and of higher molecular weight known in polyurethane chemistry which are free from tertiary nitrogen atoms and contain hydrogen which is reactive with isocyanate groups, e.g. low molecular weight glycols or polyols such as ethylene glycol, propanediol, trimethylolpropane, glycerol, etc. or higher molecular weight, difunctional or higher functional, hydroxyl-containing polyethers, polyesters, polycarbonates and polyacetones. Other examples of polyisocyanates suitable for the process according to the invention and of compounds which contain active hydrogen may be found e.g. in U.S. Pats. 3,338,087, 3,480,-592, 3,479,310 and U.S. pat. application Ser. No. 43,651 filed on Apr. 29, 1970.

Substances suitable for the process according to the invention which have a quaternising or neutralising action are any quaternising agents e.g. alkyl halides such as methyl iodide, ethyl bromide, n-butyl chloride, n-dodecyl chloride, n-octadecyl bromide, benzylchloride, naphthyl methyl chloride, 1-phenyl-12-bromododecane, chloroacetamide, dialkyl sulphates such as dimethylsulphate, etc. as well as any inorganic or organic acids, e.g. hydrochloric acid, hydrobromic acid, hydroiodic acid, sulphuric acid, phosphoric acid, phosphorous acid, tartaric acid, acetic acid, chloroacetic acid, benzoic acid, p-nitrobenzoic acid, etc. It is especially advantageous in the process according to the invention to use dimethylsulphate or chloroacetamide as quaternising agent and/or phosphoric acid, acetic acid or tartaric acid as neutralising agent.

Compounds containing active hydrogen atoms that are reactive with isocyanate groups and which are free from tertiary nitrogen which may be used in the process of the invention are higher molecular weight polyhydroxyl compounds having a molecular weight of from about 300 to about 10,000 as e.g. those described in U.S. Pat. 3,479,-310. Furthermore chain-lengthening agents with molecular weights of below 300 and which do not contain tertiary nitrogen atoms e.g. those mentioned in U.S. Pat. 3,479,-310 may also be used in the process of the invention.

In the process according to the invention, the reactants are brought together in an NCO/OH ratio of 0.7 to 2.5, preferably 0.9 to 1.7. The quantity of glycol which contains tertiary amino nitrogen atoms is 2 to 20, preferably 2 to 10% by weight, based on the total amount of polyurethane. The alkylating or neutralising substances are used in equivalent or subequivalent quantities based on the amount of tertiary amino nitrogen. Neutralising substances may also be used in excess provided that the pH does not thus drop below about 1.5.

Synthesis of the polyurethanes according to the invention may be carried out in a known manner in organic solvents, e.g. according to U.S. Pats. 3,338,087, 3,480,-592, 3,479,310, U.S. patent application Ser. No. 43,651 filed on Apr. 29, 1970, Belgian Pat. 704,521 or U.S. patent application Ser. No. 701,106 filed on Jan. 29, 1968. If water is simply stirred into the solutions which contain polyurethanes containing quaternary ammonium nitrogen and the solvent is distilled off, stable, cationic aqueous polyurethane dispersions are obtained.

On the other hand, synthesis of the polyurethanes according to the invention may also be carried out in the melt in accordance with U.S. patent application Ser. No. 809,987, filed on Mar. 24, 1969. Here again, stable, cationic aqueous polyurethane dispersions are obtained from the melt which contains quaternary ammonium nitrogen by the addition of water.

The sequence in which the various components are added in the course of synthesis of the polyurethanes according to the invnetion is immaterial. The quaternising reaction is carried out in a known manner by the addition of the quaternizing or neutralising agent, optionally in a solvent, to the basic polyurethane. On the other hand, the quaternising or neutralising agent may also be added before or during synthesis of the polyurethanes, optionally in solution. Alternatively, the tertiary amino glycols to be used according to the invention may previously be quaternised or converted into the salt form, optionally in a solvent, and the salts which have thus been prepared separately may then be reacted with polyisocyanates and polyols or with prepolymers which contain isocyanate groups.

The polyurethanes according to the invention are characterised by their exceptional light fastness, as is demonstrated quite clearly by the examples and comparison test. They may be used inter alia as thermoplastic, rubber-like masses, e.g. in the form of moulded articles, films or threads.

They may also be used in the form of their solutions or preferably as aqueous dispersions for coating or impregnating woven and non-woven textiles, leather, paper, wood, metal, ceramic, stone, concrete, bitumen, hard fibre, straw, glass, porcelain, various types of synthetic resins and glass fibres, for producing antistatic and crease-resistant finishes, as binders for fleeces, adhesives, laminating agents, plasticisers, binders, e.g. for cork powder or sawdust, glass fibres, asbestos, paper type materials, plastics or rubber waste, ceramic materials, as auxiliary agents for cloth printing and in the paper industry, as additives for polymers, as sizing agents and for treating leather.

The superior quality of the products according to the invention are particularly apparent whenever it is important to achieve optimum light fastness, as, for example, in the lacquer and coating industry.

Especially when used in the treatment of textiles and in the production of synthetic leather, the products previously proposed frequently have a handle which is too hard and tend to harden, especially at low temperatures. There is, therefore, a need to overcome these technical disadvantages in use by special products. The following properties are therefore mentioned as further advantages of the polyurethanes according to the invention in addition to their special light fastness:

(1) Greater thermal stability
(2) Lower freezing temperature, and
(3) Greater softness when used in the production of coating materials.

The products may also be used as adhesives, as components mixed with paints and lacquers to improve their abrasion resistance, and as additives for lubricants. The polyurethanes present in the form of dispersion are also suitable for use as emulsifiers for the preparation of polymer dispersions, e.g. the preparation of polyurethane dispersions from non-ionic polyurethanes. Dispersions, suspension or pastes are advantageously applied to porous supports which then remain combined with the finished product, e.g. woven or non-woven textiles or fibre mats, felts or fleeces or even paper fleeces.

The properties of the new polyurethanes and of the dispersions prepared from them can be modified by the addition of polymers, polycondensates or active or inactive fillers. Suitable additives of this type are, for example, polyethylene, polypropylene, polyvinyl acetate, ethylene/vinyl acetate copolymers which may be (partly) saponified and/or grafted with vinyl chloride, styrene/butadiene copolymers, ethylene (graft) copolymers, urea formaldehyde resins, carbon black, silicic acid, asbestos, talcum, kaolin, titanium dioxide, glass in the form of powder or fibres, cellulose, etc. The end product may contain up to 70% of such fillers, based on the total amount of dry substance, according to the desired properties of the product and its intended use.

The addition of these substances may be carried out at various stages during the preparation and in various forms. Thus, for example, polymers may be added in the preparation of the polyurethane dispersions but they may also be added in the form of their aqueous emulsions, suspensions or as powder to the finished polyurethane suspensions, pastes or powders produced from them, in which case they act as fillers.

Dyes, pigments, plasticisers or additives which affect the flow properties may, of course, also be added.

Films obtained from finely divided dispersions and sols are suitable for use as stoving lacquers or air drying lacquers. They combine great hardness and elasticity with good gloss, good weather resistance and excellent light fastness.

EXAMPLES

The following comparison tests were carried out to demonstrate the resistance to yellowing and degradation in the polyurethane ionomers prepared according to the invention compared with products produced according to the prior art:

Three polyurethane ionomers were prepared in tetrahydrofuran in accordance with the general recipe given below, using three different aliphatic tertiary aminodiols. The homogeneous solutions which are gel-like in the anhydrous state were aged in diffuse daylight for 6 months and the discolouration was assessed visually. Aqueous dispersions were then prepared from the gels by heating, stirring in water and removing the tetrahydrofuran by distillation, and these dispersions were tested to assess their stability and film forming capacity.

Example 1

Method.—425 g. (0.25 mol) of a polyester of adipic acid, hexanediol and neopentyl glycol (molar ratio 30:22:12) are dehydrated at 120° C./17 mm. Hg and reacted with 188 g. (0.75 mol) of 4,4'-diphenylmethane diisocyanate at 60 to 70° C. for one hour. The prepolymer formed is chain lengthened by stirring it with 0.5 mol of one of the aminodiols mentioned below in 300 g. of tetrahydrofuran at 60° C. The reaction mixture is diluted to 25% after 30 minutes by the addition of more tetrahydrofuran. The solution is quaternised with 63 g. of dimethylsulphate in 200 g. of tetrahydrofuran at room temperature and solidifies in the course of 1 to 5 hours to a solid but not cross-linked gel. After 6 months' storage, an aqueous polyurethane dispersion was prepared by the addition of 600 g. of water to 700 g. of the polyurethane solution and removal of the tetrahydrofuran by distillation.

Aminodiols used:
(A) 2 - ethyl - 2-dimethylaminomethyl-1,3,-propanediol (according to the invention).

(B) N-methyl-diethanolamine and (C) N-butyl-diethanolamine—prior art.

COLOUR

| | Aminodiol | Fresh preparation | After 6 months | Properties of the dispersion |
|---|---|---|---|---|
| Experiment: | | | | |
| 1 | B | Pale yellow gel. | Red brown fluid. | Unstable, greasy grey brown mass as lower phase. |
| 2 | C | Yellow brown gel. | Dark red brown fluid. | Do. |
| 3 | A | Colourless gel. | Colourless gel. | Stable colourless gel. |

Example 2

456 g. of a phthalic acid ethylene glycol polyester of OH number 160, 90 g. of an adipic acid ethylene glycol polyester of OH number 56 and 26 g. of 2-ethyl-2-dimethylaminomethyl-1,3-propanediol are heated to 45° C. with 150 cc. of acetone. 139.5 g. of toluylene diisocyanate (mixture of isomers 2,4/2,6=65/35) and 42.5 g. of 1,6-hexamethylene-diisocyanate are added in the course of 30 minutes. The reaction mixture is stirred for 4 hours at 60° C. then left to stand overnight at room temperature, and the next morning 640 cc. of acetone and 10 cc. of dimethylsulphate are added successively at 60° C.

273 g. of this solution are mixed with a solution of 1.5 cc. of ethylene diamine and 0.5 cc. of diethylene triamine in 20 cc. of acetone with vigorous stirring at 40° C., whereupon the viscosity rises sharply within 20 minutes. A solution of 1.5 cc. of 85% phosphoric acid in 10 cc. of water followed by 160 cc. of water are then rapidly stirred in and the acetone is evaporated off in a water jet vacuum.

A 52% concentration of a highly fluid, stable latex is obtained which can be used, for example, for lacquering metal surfaces or wood and for producing high gloss top coats on paper and cardboard. Only very slight yellowing can be found after 110 hours' exposure of the sample in a Fade-O-Meter.

When the same experiment is carried out with 19 g. of N-methyldiethanolamine as tertiary aminodiol, a latex which is suitable for lacquering purposes is again obtained but when this is exposed in the Fade-O-Meter it shows distinct yellowing after 110 hours.

Example 3

In the following examples, the melts of the polyurethane salts according to the invention are converted into stable, cationic, aqueous polyurethane dispersions by stirring water into them.

140 g. of 1,6-hexanediisocyanate are added dropwise in the course of about 2 minutes to a mixture heated to 70° C. of 500 g. of a polyester of adipic acid, hexanediol and neopentyl glycol (molar ratio 30:22:12, molecular weight 1740), 33 g. of urea and 41 g. of 2-ethyl-2-dimethylamino methyl-1,3-propanediol. The temperature rises to above 135° C., the reaction mixture is kept at this temperature for 30 minutes, 30 cc. of glycol methylether acetate are added, the reaction mixture is cooled to 110° C. and 20 g. of 85% phosphoric acid in 200 cc. of water are introduced dropwise in the course of 10 minutes. 400 cc. of hot water, 0.5 cc. of 30% Formalin and a further 500 cc. of water are then successively added dropwise. The reaction mixture is stirred for one hour at 90° C. and then cooled to room temperature.

1850 g. of a finely divided cationic polyurethane latex having a solids content of 39.6% and a pH of about 5 are obtained.

A film which has been dried in air and later at 120° C. for 20 minutes (Shore hardness A 50) does not show the slightest trace of yellowing either after 12 days of oxygen test or after 110 hours in the Fade-O-Meter test.

Examples 4–14

The table contains detailed information about Examples 4–14 which were carried out in a manner analogous to Example 3 and which contain variations of the polyesters, the basic glycols according to the invention and the salt forming components.

Flms prepared in a manner analogous to Example 3 are in all cases free from yellow both after 12 days' oxygen test and after 110 hours' Fade-O-Meter test.

having a quaternising or neutralising action, the improvement which comprises utilizing from 2–20% by weight based on the total amount of polyurethane of a glycol containing tertiary amino nitrogen of the general formula

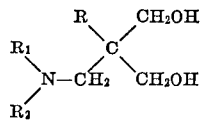

TABLE

| Example | Polyester[1] | 1,6-hexane-diisocyanate (grams) | Basic glycol [2] | Basic glycol Grams | 85% phosphoric acid (grams) | 30% Formalin (cc.) | Urea (grams) | pH | Solids content | Shore A Hardness or micro-hardness+ |
|---|---|---|---|---|---|---|---|---|---|---|
| 4 | HN | 140 | 2 | 48 | 20 | 65 | 33 | 4.5 | 40.6 | 60 |
| 5 | HN | 129 | 1 | 41 | 20 | 35 | 18 | 4.5 | 34.3 | 62 |
| 6 | DD | 108 | 1 | 36 | 16 | 50 | 20 | 5 | 34.2 | 44+ |
| 7 | DD | 119 | 1 | 35 | 17 | 65 | 29 | 5 | 36.0 | 60+ |
| 8 | DD | 108 | 3 | 45 | 16 | 50 | 20 | 5 | 35.5 | 65+ |
| 9 | DD | 108 | 4 | 49 | 16 | 50 | 20 | 4 | 28.3 | 33+ |
| 10 | DD | 137 | 1 | 41 | 19 | 60 | 33 | 5 | 36.0 | 38+ |
| 11 | PE | 108 | 1 | 36 | 18 | 80 | 30 | 5 | 37.1 | 67 |
| 12 | PE | 140 | 1 | 41 | (3) | 130 | 33 | 4.5 | 37.3 | 72 |
| 13 | DD | 120 | 5 | 33 | 17 | 80 | 30 | 5 | 36.0 | 42+ |
| 14 | DD | 120 | 6 | 39 | 17 | 80 | 30 | 5 | 36.4 | 41+ |

[1] Polyester in each case 500 g.: HN=polyester of adipic acid, hexanediol and neopentyl glycol (molar ratio 30:22:12, molecular weight 1,740); DD=polyester of adipic acid, hexanediol and neopentyl glycol (molar ratio 30:22:12, molecular weight 1,960); PE=polyester of phthalic acid, adipic acid and ethylene glycol (molar ratio 1:1:2.3, molecular weight 1,650).

[2] Basic glycols: 1=2-ethyl-2-dimethylaminomethyl1-1,3-propanediol; 2=2-ethyl-2-diethylaminomethyl-1,3-propanediol; 3=2-ethyl-2-pyrrolidinomethyl-1,3-propanediol; 4=2-ethyl-2-(N-methyl)piperazinomethyl-1,3-propanediol; 5=2-methyl-2-dimethylaminomethyl-1,3-propanediol; 6=2-methyl-2-diethylaminoethyl-1,3-propanediol.

[3] In Example 12, partial quaternisation and partial salt formation were carried out with 14 g. of monochloroacetamide, 6 6. of acetic acid and 33 g. of tartaric acid.

What is claimed is:

1. Polyurethane polymers containing quaternary ammonium nitrogen in at least one structural unit of the general formula

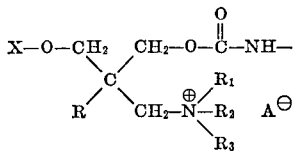

wherein
R is an alkyl radical having 1 to 5 carbon atoms, and either $R_1$ is an alkyl radical having 1 to 4 carbon atoms and
$R_2$ is an alkyl radical having 1 to 18 carbon atoms, or $R_1$ and $R_2$ together with the nitrogen atom form a heterocyclic ring containing 4 to 6 carbon atoms,
X is hydrogen or —CO—NH—,
$R_3$ is hydrogen, an alkyl radical or an aralkyl radical and
$A^\ominus$ is a singly negatively charged ion corresponding to an inorganic or organic acid.

2. In the process for the preparation of the light fast polyurethanes of claim 1 which contain quaternary ammonium nitrogen by the isocyanate polyaddition process from organic polyisocyanates, compounds containing active hydrogen atoms that are reactive with isocyanate groups, said compounds being free from tertiary nitrogen, glycols containing tertiary amino nitrogen and substances wherein R is an alkyl radical having 1 to 5 carbon atoms, and either $R_1$ is an alkyl radical having 1 to 4 carbon atoms and
$R_2$ is an alkyl radical having 1 to 18 carbon atoms, or $R_1$ and $R_2$ together with the nitrogen atom form a heterocyclic ring containing 4 to 6 carbon atoms.

3. The process of claim 2 wherein R, $R_1$ and $R_2$ are methyl or ethyl groups.

4. An aqueous dispersion which comprises the polyurethane polymers of claim 1 dispersed in water.

References Cited

UNITED STATES PATENTS

| | | | |
|---|---|---|---|
| 3,412,054 | 11/1968 | Milligan et al. | 260—29.2 TN |
| 3,461,102 | 8/1969 | Oertel et al. | 260—77.5 SP |
| 3,461,106 | 8/1969 | Oertel et al. | 260—77.5 SP |
| 3,479,310 | 11/1969 | Dieterich et al. | 260—29.2 TN |
| 3,480,592 | 11/1969 | Dieterich et al. | 260—29.2 TN |

FOREIGN PATENTS

| | | |
|---|---|---|
| 2,001,067 | 8/1969 | France. |
| 2,001,070 | 8/1969 | France. |

JULIUS FROME, Primary Examiner

A. H. KOECKERT, Assistant Examiner

U.S. Cl. X.R.

260—75 NQ, 77.5 Q, 77.5 SP, 77.5 AM